United States Patent [19]

O'Neil et al.

[11] Patent Number: 4,975,239
[45] Date of Patent: Dec. 4, 1990

[54] BWR CORE FLOW MEASUREMENT ENHANCEMENTS

[75] Inventors: Timothy J. O'Neil; Joseph A. McGrady, both of San Jose, Calif.

[73] Assignee: General Electric Company, San Jose, Calif.

[21] Appl. No.: 300,012

[22] Filed: Jan. 23, 1989

[51] Int. Cl.$^5$ ............................................. G21C 17/00
[52] U.S. Cl. .................................. 376/247; 376/246; 376/210; 376/216
[58] Field of Search ............... 376/247, 246, 210, 211, 376/215, 216

[56] References Cited

U.S. PATENT DOCUMENTS

| | | | |
|---|---|---|---|
| 4,400,343 | 9/1983 | Izumi et al. | 376/417 |
| 4,486,381 | 12/1984 | Hirukawa Koji et al. | 376/210 |
| 4,617,168 | 10/1986 | Muralidharan et al. | 376/247 |
| 4,774,049 | 9/1988 | Impink, Jr. et al. | 376/245 |
| 4,842,806 | 6/1989 | Ohtomi | 376/247 |

Primary Examiner—Stephen J. Lechert, Jr.
Assistant Examiner—Nina Bhat
Attorney, Agent, or Firm—Robert R. Schroeder

[57] ABSTRACT

An apparatus and process for the accurate measurement and calibration of core flow in a boiling water reactor is disclosed. The reactor includes a pressure vessel having internal forced circulation through the core. An annular downcomer region establishes reactor coolant flow downwardly in the periphery of the reactor vessel and finally upwardly and centrally into the core across a core plate. A pressure sensor detecting the pressure differential across the core plate is utilized. This pressure sensor has its measurement enhanced by input from local power range monitors in the core to utilize both the sensed pressure differential and the power to predict more accurately flow in the reactor. An algorithm is developed for utilizing the pressure differential and the real time readings from the local power range monitor to accurately gauge overall reactor coolant flow. To ensure accurate calibration, two calibration standards are itilized at steady states of reactor power output and coolant flow. A first calibration standard includes the installation of thermocouples adjacent the reactor core plate for measurement of fluid enthalpy of the coolant as it flows upwardly through the reactor core. The determined enthalpy is utilized in an energy flow balance wherein the core flow rate is solved for as an unknown. A second calibration standard utilizes the sensed pressure differential across the annular pump deck of the forced circulation pumps. The two standards are combined in output utilizing a least squares averaging, and the result combined to calibrate the disclosed algorithm.

4 Claims, 4 Drawing Sheets

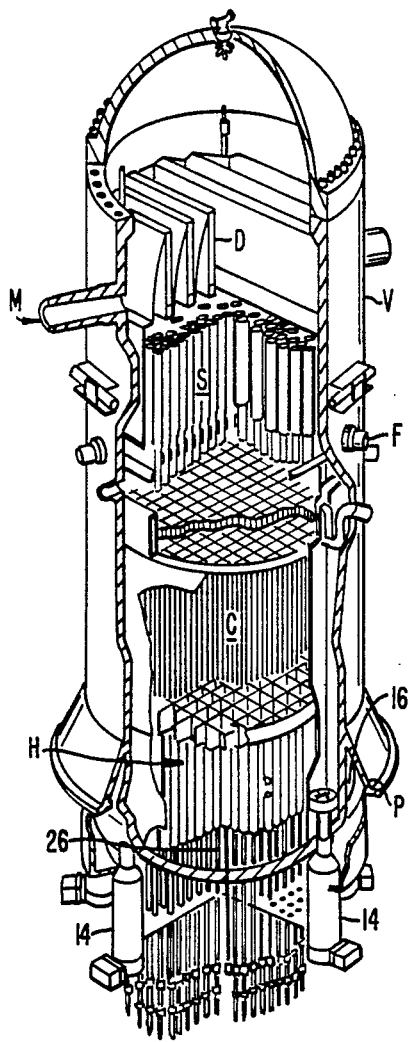
FIG._1.
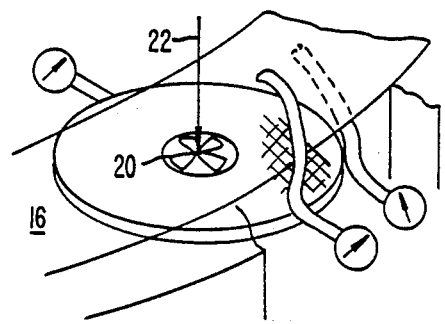
FIG._2B.
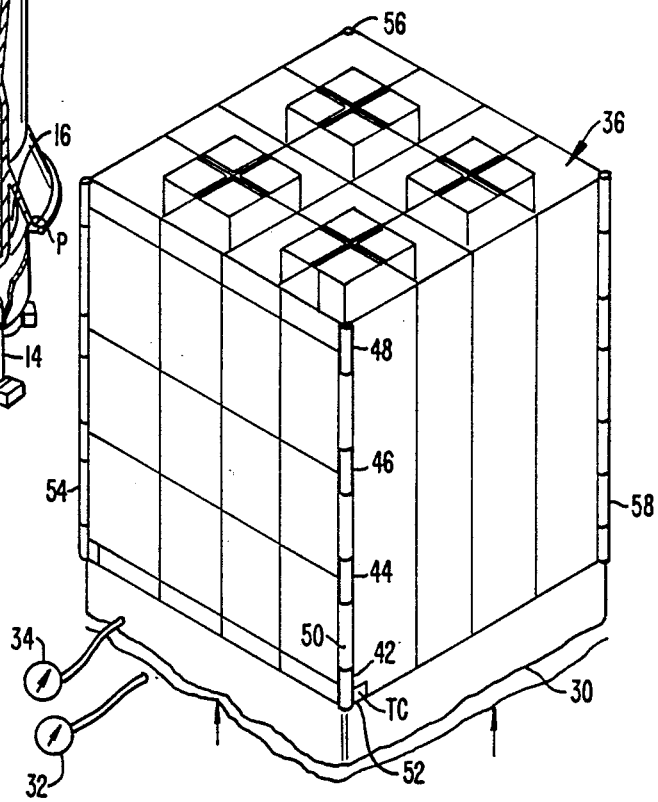
FIG._2A.

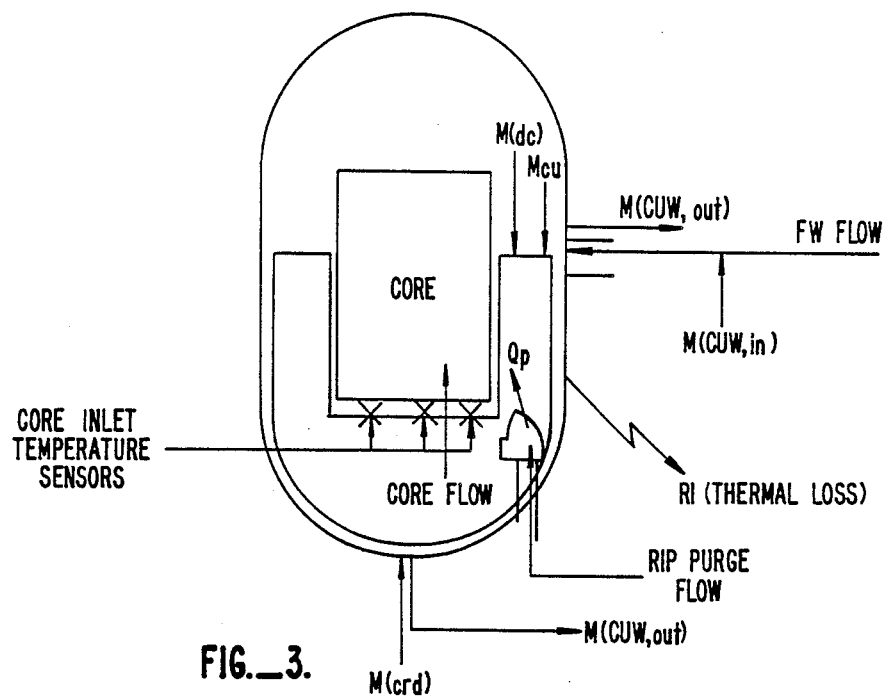
FIG._3.
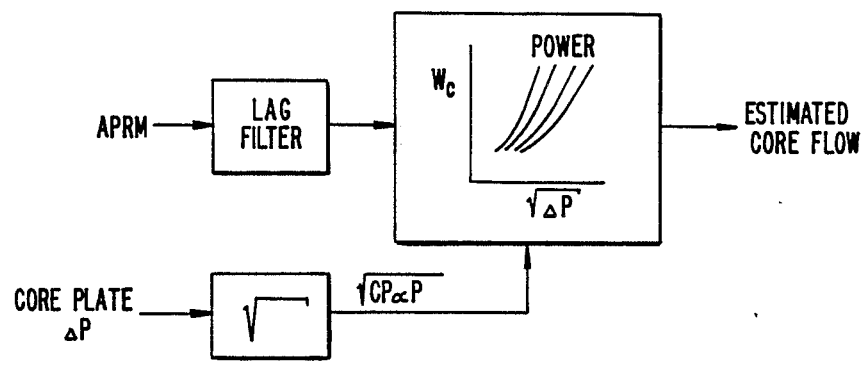
FIG._4.

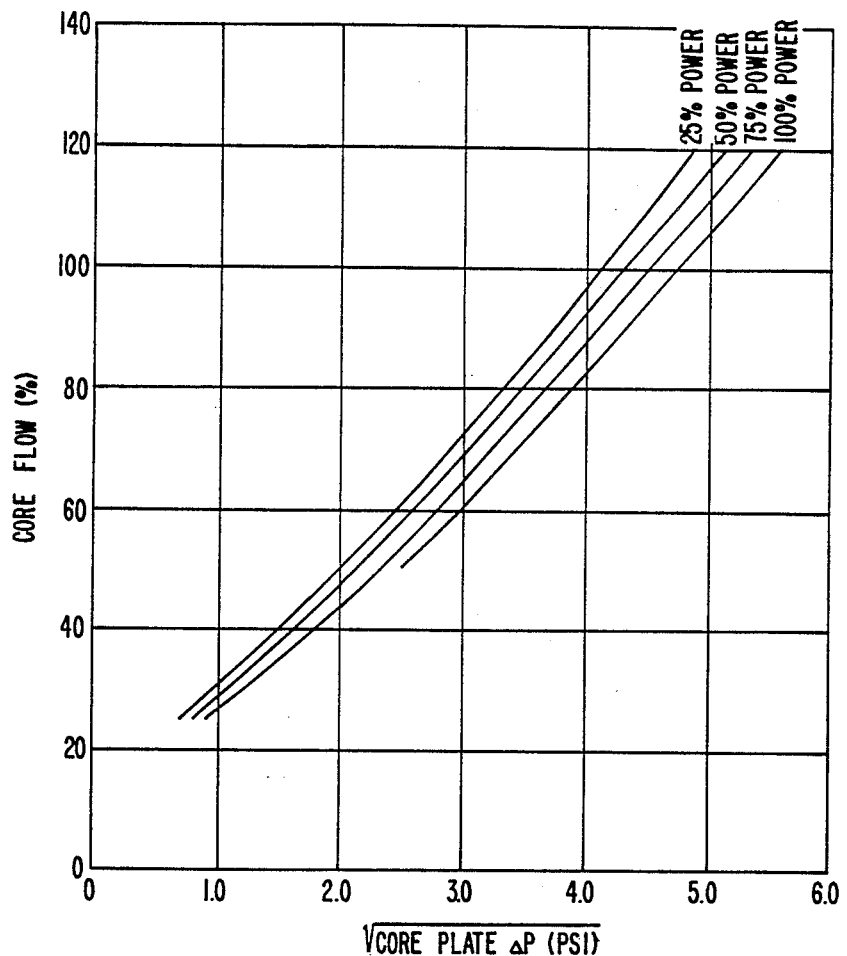
FIG._5.

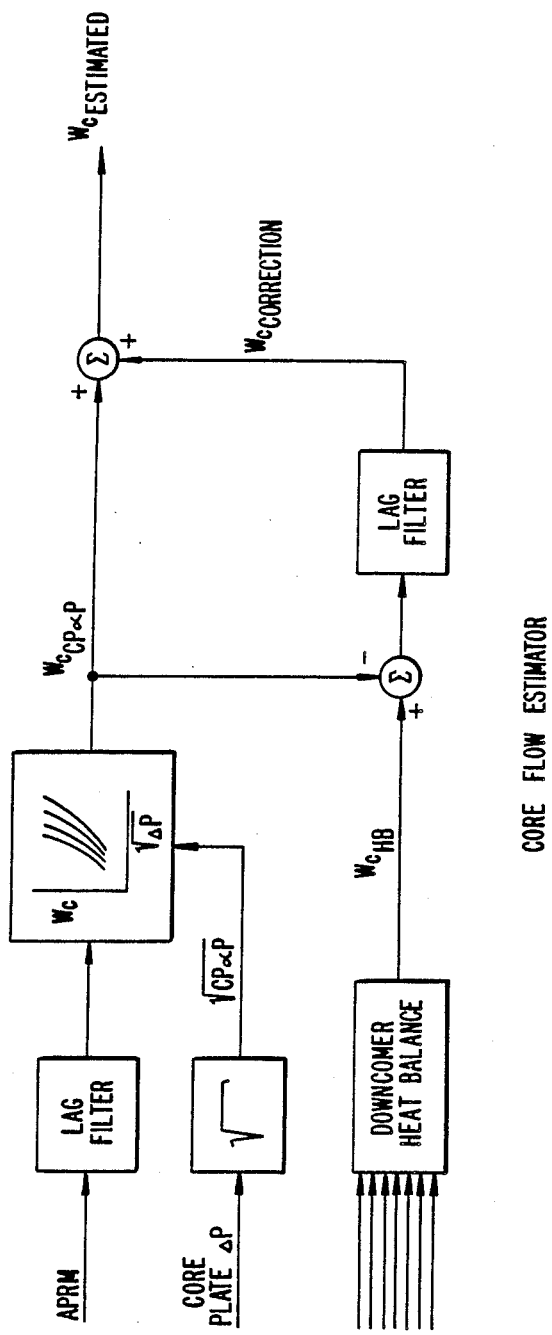
FIG._6.
CORE FLOW ESTIMATOR

BWR CORE FLOW MEASUREMENT ENHANCEMENTS

Measured core flow is used in boiling water reactors for several functions. These functions include input to the plant protection system for flow based reactor trip functions, feedback signals for recirculation flow control, and inputs to the process computer for plant performance calculation (that is to say, minimum critical power ratio power calculations). An accurate estimate of core flow is required to support these critical functions.

In prior art boiling water reactors, external recirculation has been utilized. Simply stated, fluid is withdrawn from the reactor vessel, pumped to high pressures and then discharged in the reactor vessel. Such discharge in the reactor vessel occurs through large jet pumps which include diffusers. These jet pumps entrain the bulk of water within the downcomer region of the reactor and cause the forced circulation. Heretofore, the presence of the external recirculation loops and the jet pumps has made possible relatively accurate estimates as to the total flow occurring in the reactor vessels.

The newer designs of boiling water reactors do not employ the external recirculation loops and the jet pumps to force circulation within the reactor. Presently, advanced boiling water reactors are designed, which advanced boiling water reactors includes impeller pumps. In a reactor design herein disclosed, an annular deck is placed around the peripheral downcomer region. This annular deck has impeller pumps pumping water downwardly through the periphery of the reactor, a preferred embodiment of the annular deck radially distributed at 36° intervals ten such pumps. Core flow occurs by having the pumps draw the downcomer fluid downwardly into a plenum below the core. Thereafter, the fluid reverses direction and is forced upwardly through the reactor core plate and then through the core.

Many factors affect the relationship between core flow and the differential pressure across the core plate. These factors include core power, axial power shape, the buildup of debris in the core plate orifices, calibration accuracy and the like. Therefore, trying to estimate core flow as a function of the differential pressure across the core plate is considerably less accurate than methods utilized for measuring core flow in conventional boiling water reactors having external recirculation loops and jet pumps.

SUMMARY OF THE INVENTION

An apparatus and process for the accurate core flow measurement and calibration of core flow measurement in an advanced boiling water reactor is disclosed. The reactor includes a pressure vessel having internal forced circulation through the core. An annular downcoming region establishes reactor coolant flow downwardly in the periphery of the reactor vessel and finally upwardly and centrally into the core across a core plate. A pressure sensor detecting the pressure differential across the core plate is utilized. This pressure sensor has its measurement enhanced by input from local power range monitors in the core to utilize both the sensed pressure differential and the power to predict more accurately flow in the reactor. An algorithm is developed for utilizing the pressure differential and the real time readings from the local power range monitor to accurately gauge overall reactor coolant flow. To ensure accurate calibration, two calibration standards are utilized at steady states of reactor power output and coolant flow. A first calibration standard includes the installation of thermocouples adjacent the reactor core plate for measurement of fluid enthalpy of the coolant as it flows upwardly through the reactor core. The determined enthalpy is utilized in an energy flow balance wherein the core flow rate is solved for as an unknown. A second calibration standard utilizes the sensed pressure differential across the annular pump deck of the forced circulation pumps. The two standards are combined in output utilizing a least squares averaging, and the result combined to calibrate the disclosed algorithm.

An object of this invention is to place in quadratic format a determination of overall reactor core flow. Accordingly, an equation is disclosed, which can be utilized for combining sensed pressure differential at the core plate of the reactor with instantaneous power output to determine more accurately core flow.

An advantage of this aspect of the invention is that for the first time, core flow can be determined utilizing both the sensed pressure differential and the input from the local power range monitors in the reactor, thereby eliminating the uncertainty resulting from the effect of core power on the differential pressure/core flow relationship.

A second aspect of this invention is to disclose an improved scheme of calibration of the core flow. Accordingly to this aspect of the invention, two separate approximations of core flow are utilized, each of these core flow approximations being utilized at steady state (that is, steady and constant power and flow of the reactor).

A first of these flows is the sensing of pressure differential across the annular pump deck of the reactor.

A second of these flows is derived from a heat balance. According to this aspect of the invention in addition to sensing the pressure at the core plate, thermocouples are utilized at preselected points adjacent the core plate for the measurement of the upflowing enthalpy of the water. This sensitive measurement is combined in a heat balance on the subcooled liquid side of the reactor. This heat balance yields an improved means of determining the core flow rate.

It is a further object of this invention to combine the two calibrating core flow rates. These combined calibrating core flow rates are utilized in a least squares fit to enable appropriate constant adjustment of the disclosed quadratic equation. This appropriate constant adjustment enables initial high predictability of flow rates as well as on line calibration of flow rates once plant operation has commenced.

BRIEF DESCRIPTION OF THE DRAWINGS

Other objects, features and advantages of this invention will be more apparent after referring to the attached specification and following drawings in which:

FIG. 1 is a side elevation schematic of the type of reactor to which the flow principles of this invention are applied;

FIG. 2A is a schematic of a section of the reactor core, the section including an illustration of the core plate, the sensing of the pressure differential across the core plate and the temperature of the upwardly flowing coolant by illustrated thermocouples for the determination of the enthalpy of the upwardly flowing subcooled coolant;

FIG. 2B illustrates annular pump deck with the pressure differential being taken from the pump deck;

FIG. 3 is a schematic illustrating the energy balance taken in the subcooled liquid portion of the reactor;

FIG. 4 is a schematic illustrating the algorithm for determination of core flow utilizing the core flow pressure change and the output from the power monitor;

FIG. 5 is a representative plot of core flow in percent against the square root of the core plate pressure, discrete curves for the particular power rates being illustrated to set forth the changing resistances; and FIG. 6 is a schematic showing a further variation of this invention, this schematic including a corrected flow responsive to the downcomer heat balance as well as the initial measurements resulting in the determination of core flow.

Referring to FIG. 1, a reactor vessel V is disclosed. It will be assumed that the reader is in large measure familiar with the nuclear steam cycle. This specification will therefore be limited to the recirculation characteristics of such reactors with the balance of the steam cycle for the most part being ignored. In summary form, steam is outlet from main steam line M and cycled through a turbine/generator, and condenser (not shown) for the generation of power. After condensation and appropriate make up, feedwater is introduced at inlet F.

A plurality of pumps P all driven by submersed motors 14 force the circulation in the interior of the reactor. Such circulation can be easily identified.

Specifically, an annular deck 16 surrounds the central portion of the reactor. Ten motors 14, each driving a discrete impeller 20, cause fluid to be forced circulated through the reactor.

Referring to the detail of FIG. 2B, it can be seen that coolant passes downwardly driven by the impeller in the direction of vector 22 and passes outwardly down and below to the bottom part portion of vessel V. In the lower plenum 26 of vessel V, the fluid mixes and reverses flow direction. From plenum 26 the fluid passes upwardly through a core C. In core C, heat is added by the nuclear reaction. The rising steam/water mixture passes through separators S to a steam dryer assembly D. Most of the steam flow thereafter exits the vessel V through the main steam line M. Virtually all of the saturated liquid from the separators and steam dryers flows downward into the downcomer region. Mixing of this saturated liquid flow with the subcooled feedwater flow, from the feedwater inlet lines F, yields subcooled liquid flow in the downcomer region.

A section of the core is illustrated at FIG. 2A.

Referring to FIG. 2A, the core plate 30 is illustrated. A group of control rod guide tubes T (see FIG. 1) supports through the core plate 30 the 16 fuel bundles illustrated in FIG. 2A. Paired pressure gauges 32, 34 sense the pressure differential across the core plate 30. This pressure differential measurement constitutes an important input to the flow rate determination.

Each group of 16 fuel bundles 36 is monitored by local power range monitors. Four such local power range monitors are shown at 42, 44, 46, and 48 in string 50. Schematically shown attached to string 50 is a thermocouple 52. Likewise, similar local power range monitor strings 53, 54, and 56 all monitor the performance of the core. These local power range monitors strings include the local power range monitor neutron sensors. A few of the local power range monitor spaced around the core contain thermocouples 52 to measure core inlet temperature.

As far as the local power range monitor strings are concerned, the reader will understand that the addition of the thermocouples 52 constitutes the addition of new apparatus at this location in the core. It is these thermocouples which accurately measure the temperature of the core coolant flowing upwardly in the saturated flow of the reactor coolant that enable an energy balance to take place. This energy balance, as will hereinafter be set forth, requires accurate measurement of the upflowing coolant enthalpy and is required for the development of the core flow predicting algorithm of this invention.

A simple fit based on two, independent, quadratic equations of core plate differential pressure and filtered neutron flux has been derived for calculating core flow in the Advanced Boiling Water Reactor illustrated in FIG. 1. The fit equation is determined from thermal hydraulic analysis results. The uncertainty of the core flow calculated from this fit has been determined to be less than 5.2% of rated flow at all power levels. The effect of crud and debris buildup throughout the cycle was taken into account when calculating the core flow uncertainty.

A second method of determining the core flow fit equation will achieve more accurate results. The quadratic equation based on filtered neutron flux will be recalculated in its format based on data taken during start-up. It is anticipated the core flow can be calculated with greater accuracy.

Core flow calculated from measured Core Plate Differential Pressure (CPdP) is to be used in and therefore has utility in the following control applications in the advanced boiling water reactor:

(1) Calculation of flow biased Thermal Power Monitor (TPM) rod block and scram setpoints.
(2) Reactor Trip System (RTS) low core flow scram.
(3) Selected Control Rod Run-in (SCRRI) logic in the Recirc Flow Control (RFC) System.
(4) Core flow feedback signal in the Recirc Flow Control System.

The key factor in accurately correlating core flow to core plate differential pressure is approximating the change in bundle two phase resistance caused by changes in the bundle power. Since core plate differential pressure is directly affected by the irreversible core inlet pressure losses plus the irreversible bundle loses, the effect of changing reactor power is to change the bundle losses and thus vary the actual core flow for a given measured core plate differential pressure. This effect of changing reactor power will cause core flow to be underestimated at lower powers when the measurement is calibrated at higher powers. The uncertainty of core flow is thus larger at lower powers when calculated from only measured core plate differential pressure.

To minimize this known uncertainty, it is proposed that the algorithm for calculating core flow be based on both measured core plate differential pressure and core power.

The algorithm made up of two independent quadratic equations based on measured core plate differential pressure and reactor power is as follows:

(Eqn. 1)
$$\text{CORE FLOW} = (a + b * \sqrt{\text{core plate differential pressure}} + c * \text{core plate differential pressure}) * (d + e*P + f*P^2) * K$$

where P is the % of rated reactor power (filtered neutron flux), core plate differential pressure is in psi, and K is a calibration constant for adjusting the fit magnitude to account for crud and debris buildup. The coefficients were determined using core pressure drop data calculated by thermal hydraulic analysis code with the proper Advanced Boiling Water Reactor input data base deck. The reader will understand that these exemplary coefficients have been generated for a specific design; other designs will require other coefficients.

Preliminary Advanced Boiling Water Reactor Coefficients a=11.029
b=14.742
c=1.026
d=1.193
e=3.134E-3
f=6.8E-6

Using a simple quadratic curve fit routine, a quadratic formula for core flow versus $\sqrt{}$ core plate differential pressure was determined for each of the four sets of data at 100%, 75%, 50%, and 25% power (see FIG. 5 for representative data). The core flow results at 75%, 50%, and 25% power were divided by the 100% power core flow fit for that data. The same was done to the 100%, 50%, and 25% power data using the 75% core flow fit. This was done to determine the accuracy of a single curve (determined at a given power) in predicting the core flow versus $\sqrt{}$ core plate differential pressure curve at other powers. It was found that the shape of the core flow versus $\sqrt{}$ core plate differential pressure quadratic calculated with the 75% power data is sufficient to be used at the other power levels and provide curve-fitting accuracy within +/− 1% of rated flow (for flows between 40% and 120% of rated flow).

The above method of determining the coefficient through analysis using a thermal hydraulics code is done prior to plant startup. During plant startup, actual plant data will be collected and the coefficients can be recalibrated based on the actual plant data to enhance the core flow measurement accuracy.

CORE FLOW MEASURED FROM THE SQUARE ROOT OF CORE PLATE DIFFERENTIAL PRESSURE

Core flow can be approximated reasonably well on the 100% rod line by the simple relationship $K*\sqrt{}$ core plate differential pressure (with K calibrated at the highest power point) predicts the core flow. Therefore, it would be feasible to use $K*\sqrt{}$ core plate differential pressure to compute core flow in the Advanced Boiling Water Reactor if the calculation was only needed for the Thermal Power Monitor setpoints (which are important along the 100% rod line) and Recirc Flow Control feedback (in which repeatability is the limiting criteria). The trend is for increasing error as core power is reduced which is expected because of the known effect of varying bundle two-phase resistance. This error trend supports the use of the fit in terms of core plate differential pressure and power so that core flow may be accurately predicted below the rated rod line.

The calibration factor, K, in the core flow fit equation (1) may be adjusted throughout an operating cycle if core flow calibration sources reveal a significant difference in the core plate differential pressure calculated core flow. However, since the buildup of crud throughout the cycle is taken into account in the uncertainty calculation (in the $\sigma$exposure term), recalibration to account for crud and debris buildup is not necessitated by an increase in core flow uncertainty throughout the operating cycle.

The reader will understand that we have shown by way of example actual constants determined from a specific reactor. These constants were determined by utilizing an elaborate computer program for the prediction of reactor flow.

It is very apparent that other constants will be derived for other reactor programs.

What is important to note is that we use the readings of the local power range monitors to achieve a more accurate flow.

As part of the constant determination, it is required that the equation be calibrated. This calibration must occur not only initially (using the elaborate computer generated programs) but additionally after the reactor goes into operation. Regarding such flow prediction after the reactor goes into operation, we utilize steady state power and flow rates of the reactor. These steady state power and flow rates are utilized to determine flow at other points in the reactor. One such flow point is illustrated in FIG. 2B and constitutes the pressure differential across the annular pump deck 16 generated by the impeller pumps 20.

Calibration of the Core Flow Measurement System

One of the major contributors to the total core flow measurement uncertainty is the uncertainty associated with the reference core flow value used to calibrate the core flow measurement system. This calibration uncertainty can be reduced by using the average of two independent core flow estimates as the calibration reference. Two such independent estimates of core flow are:

1. Core flow determined from pump deck differential pressure measurements, and
2. Core flow calculated from a steady state heat balance of the vessel downcomer region.

By using the average of these two independent estimates as the calibration reference, the calibration uncertainty can be reduced by the following expression:

$$\sigma = \frac{1}{N} \sqrt{\Sigma \sigma_i^2}$$

or $$\sigma \text{calibration} = \frac{1}{2} \sqrt{\sigma Wc_{PDdP}^2 + \sigma Wc_{HB}^2}$$

Flow as a Function of Pressure Differential Across Pump Deck

Determination of flow in the reactor as a function of the pressure differential across the impeller pump deck 16 is relatively straight forward. This method requires measurements of differential pressure across points around the pump deck, measurements of individual pump speeds and vendor-supplied head/flow curves for each pump. With all the pumps operating at similar speeds, the average of the pump deck differential pressure measurements is used with the individual pump speed measurement to obtain the individual pump flow from the corresponding pump head/flow curve. The total core flow is simply the sum of the of the individual pump flows. Thus, this pump deck differential pressure method yields an independent determination of core flow.

Energy Flow Determination Utilizing Heat Balance

The following relation is used to calculate core flow from the steady state downcomer heat balance. (See FIG. 3)

$$Wc_{HB} = \frac{W_{FW}(h_f - h_{FW}) + W_{CR}(h_f - h_{CR}) + W_{RP}(h_f - h_{RP}) + C_1(Q_{CL} - Q_P + R_L)}{H_f - h_0 + f_{cu}h_{fg}}$$

where
 $Wc_{HB}$ = core flow, lb/hr
 $W_{fw}$ = feedwater flow, lb/hr
 $h_f$ = saturated liquid enthalpy, Btu/lb
 $h_{FW}$ = feedwater flow enthalpy, Btu/lb
 $W_{CR}$ = control rod drive purge flow, lb/hr
 $h_{CR}$ = control rod drive purge flow, enthalpy, Btu/lb
 $W_{RP}$ = RIP purge flow enthalpy, Btu/lb
 $h_{RP}$ = RIP purge flow enthalpy, Btu/lb
 $C_1$ = conversion constant; 3.413E6 Btu/MW-hr
 $Q_{CL}$ = net power transferred across the boundary of the reactor water cleanup loop, MW
 $Q_P$ = power added to the downcomer fluid by the recirculation pumps, MW
 $R_L$ = thermal losses, MW
 $h_0$ = core inlet enthalpy, Btu/lb
 $f_{cu}$ = steam carry-under fraction
 $h_{fg}$ = enthalpy of evaporation, Btu/lb Most of the inputs to this heat balance are readily available. It should be noted that the heat balance does require recirculation pump speed and head inputs to compute $Q_P$. However, $Wc_{HB}$ is very insensitive to these inputs, so the core flow estimates from the pump deck differential pressure method and the heat balance are essentially independent measurements.

Some instrumentation which is not currently included in the reference Advanced Boiling Water Reactor design must be added to increase the accuracy of the heat balance core flow estimate. $Wc_{HB}$ is very sensitive to the core inlet enthalpy, $h_0$. To increase the accuracy of this term, direct measurements of core inlet pressure and temperature are required. This can be achieved by using the lower taps of the core plate differential pressure measurements for pressure and installing thermocouples 52 in the cover tubes of certain Local Power Range Monitor assemblies for steady state temperature. These modifications are low cost and simple to implement. Dual thermocouples and leads should be installed in selected Local Power Range Monitor assemblies such that, in the event of a thermocouple failure, it would not be necessary to remove the dry tube for repair. The core inlet temperature would also provide a more precise measurement for monitoring vessel heatup, especially below 212° F. A bulk temperature measurement derived from saturated temperature, bottom drain temperature, and core inlet temperature would also be valuable for use in operator displays and process computer calculations.

A preliminary evaluation of the downcomer heat balance has been performed to determine the uncertainty of the core flow estimate at rated power and flow conditions. The following expression gives the total uncertainty of the heat balance core flow estimate.

$$\sigma Wc_{HB} = \left( \left[ \frac{\Delta Wc}{\Delta W_{FW}} \right]^2 \sigma^2 W_{FW} + \left[ \frac{\Delta Wc}{\Delta h_{FW}} \right]^2 \sigma^2 h_{FW} + \right.$$

$$\left[ \frac{\Delta Wc}{\Delta h_f} \right]^2 \sigma^2 h_f + \left[ \frac{\Delta Wc}{\Delta W_{R/C}} \right]^2 \sigma^2 W_{R/C} +$$

$$\left[ \frac{\Delta Wc}{\Delta h_{R/C}} \right]^2 \sigma^2 h_{R/C} + \left[ \frac{\Delta Wc}{\Delta Q_a} \right]^2 \sigma^2 Q_{CL} +$$

$$\left[ \frac{\Delta Wc}{\Delta Q_p} \right]^2 \sigma^2 Q_p + \left[ \frac{\Delta Wc}{\Delta Q_{RL}} \right]^2 \sigma^2_{RL} +$$

$$\left[ \frac{\Delta Wc}{\Delta h_o} \right]^2 \sigma^2 h_o + \left[ \frac{\Delta Wc}{\Delta f_{cu}} \right]^2 \sigma^2_{fcu} +$$

$$\left. \left[ \frac{\Delta Wc}{\Delta h_{fg}} \right]^2 \sigma^2 h_{fg} + \sigma^2_{eqn} \right)^{\frac{1}{2}}$$

where
 $\sigma_{eqn}$ = uncertainty associated with the accuracy of the heat balance expression It will be understood that $$\left[ \frac{\Delta Wc}{\Delta X} \right]$$

the above terms constitute the partial derivative of core flow $W_c$ with respect to X where X is the independent variable [X = $W_{FW}$, $h_{FW}$. . . $h_{fg}$].

The total uncertainty associated with the heat balance method of estimating core flow, $\sigma Wc_{HB}$, was shown to be 5.2%(1$\sigma$) at rated conditions.

The uncertainty of the PDdP core flow estimate across the pump deck 16, $\sigma Wc_{PDdP}$, at rated conditions as 5.3% (1$\sigma$). Therefore, by using the average of the PDdP and the steady state heat balance core flow estimates as the calibration basis, the uncertainty associated with the calibration of the core plate differential pressure measurement system, $\sigma$calib., can be reduced to 3.7%(1$\sigma$).

Core Power Adjustment

Another major contributor to the total uncertainty of the core plate differential pressure measurement system is the uncertainty due to core thermal power. FIG. 4 shows an arrangement which will adjust for the core power effect. The core plate differential pressure measurements and filtered average power range monitor (APRM) signals are used in an algorithm which estimates core flow. FIG. 5 shows the relationship between core plate differential pressure, core power and core flow. These results were derived from parametric studies using computer analysis. All other parameters (e.g., axial power distribution) were maintained constant.

With the structure shown in FIG. 4, the total uncertainty of the core plate differential pressure core flow estimate can be expressed as $$\sigma Wc_{core\ plate\ differential\ pressure} = \{\sigma^2_{curves} + \sigma^2_{curve\text{-}fit} + \sigma^2_{APRM} +$$

-continued $$\sigma^2_{trans.} + \sigma^2_{axial\ power\ shape} + \sigma^2_{crud} + \sigma^2_{leakage\ flow\ fraction} + \sigma^2_{calibration}\}^{\frac{1}{2}}$$

where

σcurves = uncertainty of the thermal hydraulic analysis results

σcurve-fit = uncertainty associated with curve-fitting the thermal hydraulic analysis results By implementing this core power adjustment enhancement, and by using the more accurate calibration methods described previously, the uncertainty of the core flow estimate from the core plate differential pressure method is reduced to approximately 5%. This is equivalent to the prior art jet pump measurement system uncertainty.

Thus, by implementing the enhancements described in this disclosure, the uncertainty of core flow measurement in an advanced boiling water reactor with internal impeller pumps can be reduced to a level similar to that of prior art boiling water reactors with external recirculation loops and jet pump.

Recirculation Flow Control System Core Flow Inputs

The core plate differential pressure method provides the core flow inputs to the Recirc Flow Control System control algorithm. In order to improve the accuracy of these signals, in addition to the core power adjustment described above, the downcomer heat balance be used for an on-line, steady state correction of the core plate differential pressure core flow estimate.

FIG. 6 depicts an estimator in which the heat balance core flow estimate is used to adjust the core plate differential pressure core flow measurement at steady state conditions. A heavy filter on the heat balance output assures that the estimator will only correct the core plate differential pressure measurements when steady state conditions are reached. The structure of this estimator is similar to that of the prior art.

With this on-line calibration device, the uncertainty of the core flow signals used in the Recirculation Flow Control System control calculation will be less than 5%. All signals are readily available. The only hardware impact associated with this enhancement is the additional instrumentation needed for core inlet pressure and temperature, as discussed above.

Although this disclosure describes the application of the core flow measurement enhancements to boiling water reactors with internal impeller pumps, it will be understood that the enhancements described herein could also be applied to other types of boiling water reactors which do not have external recirculation loops and jet pumps (e.g., natural circulation boiling water reactors).

We claim:

1. In a boiling water nuclear reactor a process for estimating core flow rate comprising the steps of:
   providing a reactor core with a nuclear reaction therein generating neutrons having a core plate fluid flow barrier at the bottom portion of said reactor core;
   providing local power range monitors arrayed throughout said core for the measurement of moderated neutrons for the determination of the power of the nuclear reaction in said core;
   providing for coolant upflow through said core plate fluid flow barrier and said core for moderating neutrons from said nuclear reaction for the critical continuation of said nuclear reaction, said upflow being at said core plate fluid flow barrier at a single liquid phase portion of said core and continuing to a two phase steam/coolant region of said core;
   measuring the pressure differential of said upflowing coolant across said core plate fluid flow barrier;
   measuring the power of said reactor at said local z power range monitors; and,
   determining a quadratic relation for coolant flow between said local power range monitor readout and said pressure differential cross said core plate; and,
   computing flow from said quadratic equation.

2. The process of claim 1 and including the further steps of:
   providing means for measuring the absolute pressure of said upflowing coolant at said core plate fluid flow barrier;
   providing means for measuring the temperature of said upflowing coolant adjacent said core plate fluid flow barrier for determining the temperature of said upflowing coolant;
   operating said reactor at a steady state of power output and coolant flow;
   determining the enthalpy of said upflowing coolant to said core in the single phase region of said reactor coolant adjacent said core plate utilizing said absolute pressure and temperature; and,
   computing the flow rate of coolant in said reactor utilizing an energy balance with said determined enthalpy; and,
   utilizing said determined flow rate from said energy balance at said steady state flow rate to calibrate said quadratic relation.

3. The process of claim 2 and including the further steps of:
   providing for the measurement of pressure differential at a single phase portion of said reactor across a barrier of flow resistance other than said core plate fluid flow barrier; and,
   measuring flow rate utilizing said barrier of flow resistance and said pressure differential across said barrier of fluid flow resistance at said steady state of power and flow; and,
   utilizing said determined flow rate from said barrier of flow resistance with said flow rate from said energy balance in an average value to calibrate said determined quadratic relation.

4. The process of claim 3 and including the step of:
   utilizing the placement of internal recirculating pumps across a pump deck extending around said reactor as the site of said barrier of flow resistance.

* * * * *